(No Model.)
H. C. HICKS.
VEHICLE WHEEL.
No. 568,112. Patented Sept. 22, 1896.
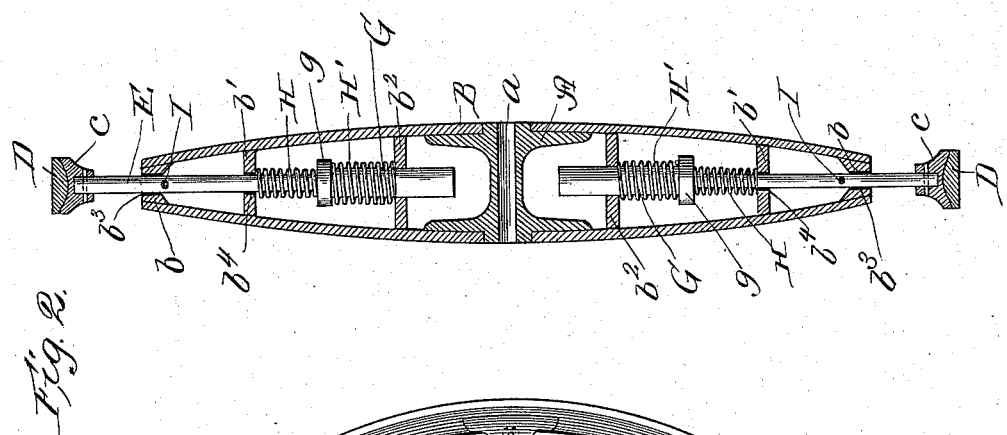
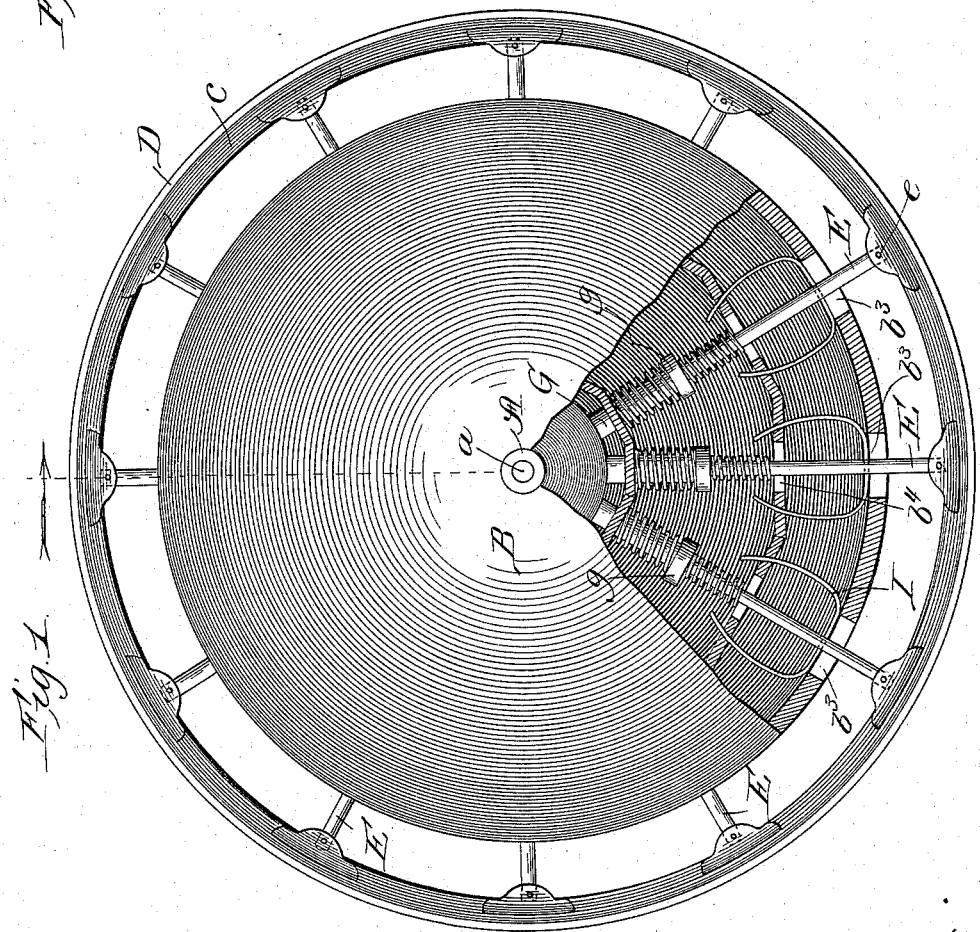
Witnesses:
Chas E Gaylord
Lute L Alter
Inventor:
Henry C. Hicks,
By Banning & Banning & Sheridan,
Attys.

UNITED STATES PATENT OFFICE.

HENRY CLINTON HICKS, OF CHICAGO, ILLINOIS.

VEHICLE-WHEEL.

SPECIFICATION forming part of Letters Patent No. 568,112, dated September 22, 1896.

Application filed September 23, 1895. Serial No. 563,410. (No model.)

*To all whom it may concern:*

Be it known that I, HENRY CLINTON HICKS, a citizen of the United States, residing at Chicago, in the county of Cook and State of Illinois, have invented certain new and useful Improvements in Vehicle-Wheels, of which the following is a specification.

The object of my invention is to produce a simple, economical, and efficient wheel adapted for use on vehicles of all descriptions, and particularly adapted to absorb the shocks incident to the use of such vehicle when striking objects on the road; and the invention consists in the features and combinations hereinafter described and claimed.

In the accompanying drawings, Figure 1 is a side elevation of a wheel, partly in section, made in accordance with my improvements; and Fig. 2, a transverse central sectional view taken on line 2 of Fig. 1.

In constructing a wheel in accordance with my improvements a hub A is provided having a central axial opening $a$, by which it may be secured to the axle of any desired vehicle. Secured to the hub at each end thereof are circular plates or disks B, which form what I term an "inclosing" frame or case. These disks are also connected together by means of the cross-pieces $b$, $b'$, and $b^2$, that form guides for the spoke mechanism hereinafter described.

A rim C is provided, to which is secured the tire D in any convenient manner. The rim is preferably made of maple-wood and the tire of a cushioning substance, though the material and shape may be changed to suit different circumstances and conditions.

To yieldingly support the rim and tire in its operative position and permit a slight lateral movement, I provide a plurality of spokes E, preferably disposed radially around the hub, and which are pivotally connected to the rim at $c$. The inner ends of the spokes are provided with enlarged portions G and head portions $g$, between which and the cross-pieces $b'$ and $b^2$ are inserted helically-coiled springs H H'. These springs are made of such strength and so adjusted that the rim is normally held equidistant from the center until the lower portion of the rim or tire, which is on the ground, meets with an obstruction, when the spring or springs H' are compressed slightly and a portion of the shock absorbed thereby. When the obstruction has been passed over, the weight of the machine consequent to the drop is taken equally on all the springs, first on the upper set of springs H, then on the larger springs H', and the larger portion of the shock absorbed.

A close examination of the drawings will show that the cross-pieces $b$ and $b'$ are slotted at $b^3$ and $b^4$, so as to permit the spokes being passed through and permit them to move longitudinally and vibrate in line with the rotation of the wheel, but so as to confine them against lateral displacement. To normally hold the spokes in their radial position, a set of U-shaped springs I are secured to them at or near the outer cross-pieces, with their free ends passed through the middle cross-pieces.

I claim—

1. In a vehicle-wheel, the combination of a hub portion, an inclosing frame attached thereto, a rim portion provided with a tire, a set of spokes pivotally secured to the rim and provided with enlargements at or near their inner ends, a set of helically-coiled springs interposed between the outer portion of the enlargements and the frame portion, and a second set of helically-coiled springs interposed between the inner portion of the enlargements and the frame portion to absorb the shock and support the parts, substantially as described.

2. In a vehicle-wheel, the combination of a hub portion, an inclosing frame formed of two circular disks secured together by cross-pieces and attached to the hub, a rim portion provided with a tire, a set of radially-disposed spokes pivotally secured to the rim and loosely mounted in the frame portion so as to permit longitudinal and vibratory motions but confined against lateral movement, enlarged portions on the spokes at or near their inner ends, a plurality of helically-coiled springs interposed between the inner and outer portions of the enlargements and the frame to absorb the shock and support the parts, and a set of springs to hold the spokes in their radial position, substantially as described.

HENRY CLINTON HICKS.

Witnesses:
 THOMAS B. MCGREGOR,
 THOMAS F. SHERIDAN.